United States Patent Office 3,196,745
Patented July 27, 1965

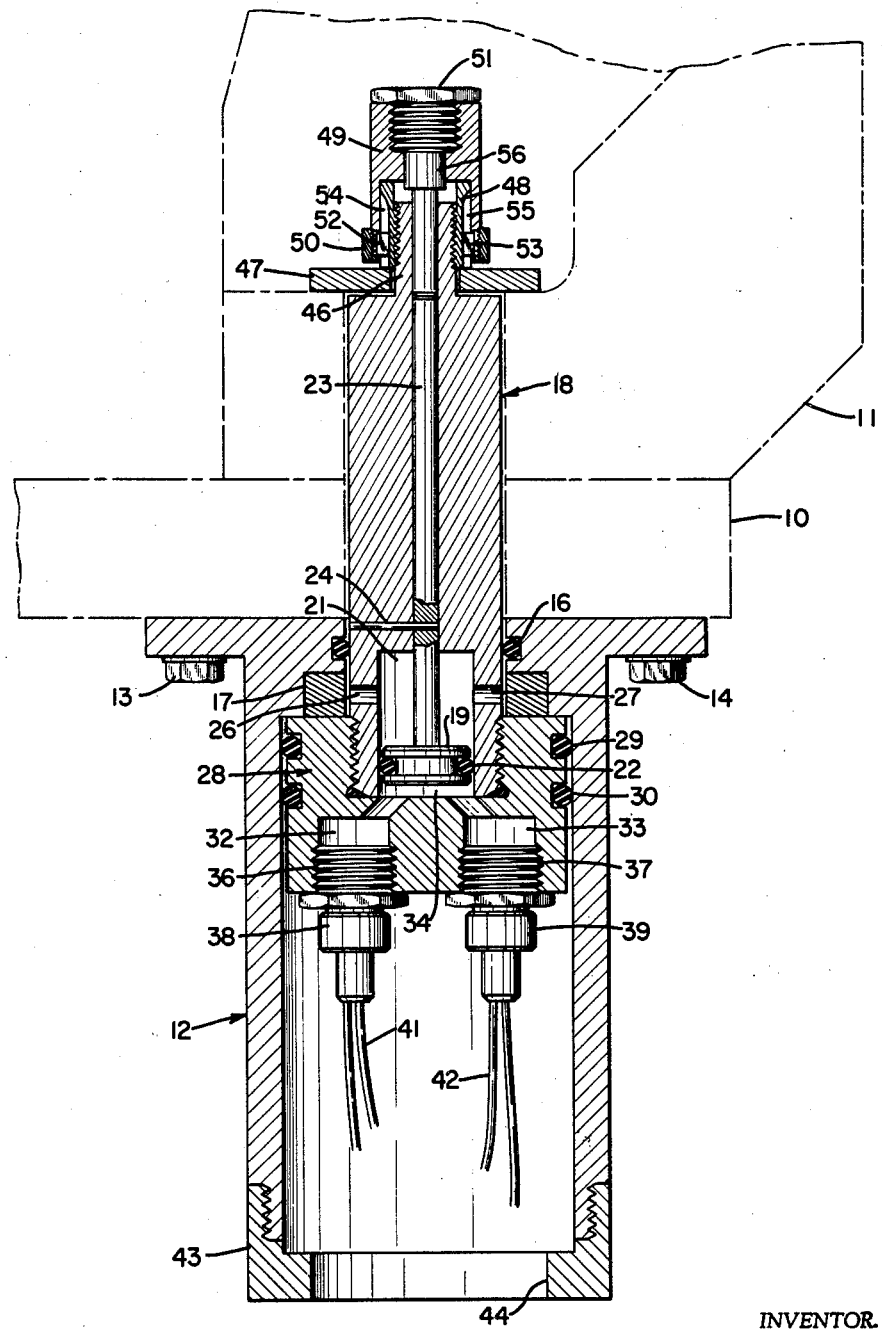

3,196,745
SEPARATION AND PIN PULLER MECHANISM
William H. Sustrich, Denver, and Neil J. Butterfield, Englewood, Colo., assignors to Martin-Marietta Corporation, Baltimore, Md., a corporation of Maryland
Filed June 7, 1963, Ser. No. 286,399
6 Claims. (Cl. 89—1)

This invention relates to a fastening and separation device resembling an explosive bolt, and particularly to such a device which serves to provide within one integrated unit both tensile and shear restraint, while fastening the joined members together, and a separation mechanism.

In airborne vehicles, fastening devices are used which can be separated or unfastened so that stage separations, jettisoning of parts, etc., can be speedily, efficiently and automatically accomplished. Such separations often must be made so that the separation mechanism provides a separation function which is compatible with lateral translation of the stage or body separated or jettisoned. This indicates a requirement for a completely uninterrupted interface after actuation of the separation mechanism of the fastening device. Furthermore, the fastening device should combine the functional characteristics of a tensile restraining mechanism with a separation and pin puller mechanism within one integrated, compact, positive, lightweight unit. In addition, it is desirable to have redundant separation features for separating the tensile load, and to accomplish the separation function with electrical and ordnance inputs at only one end of the mechanism.

Accordingly, it is an important object of this invention to provide a releasable fastening device which provides both tensile and shear restraint of the mating structural interfaces of the joined members, prior to actuation of the release mechanism, and provides a substantially completely uninterrupted structural interface after actuation of the release mechanism, which is compatible with lateral translation of the separated member from the other member.

Another object of this invention is to provide a fastening and separation device which incorporates a tensile and shear restraining mechanism with a release and separation mechanism in one compact, positive integrated unit.

A further object of this invention is to provide an explosive releasable fastening device having redundant separation features, and which accomplishes its separation function through activating power inputs introduced at only one end of the device.

Additional objects of this invention will become apparent from the following description, which is given primarily for purposes of illustration, and not limitation.

Stated in general terms, the objects of this invention are attained by providing a releasable fastening device, of the type used in missile stage separation systems, and generally resembling an explosive or deflagrating nut and bolt assembly, which includes a double piston arrangement, preferably mounted entirely within an overall bolt structure. The nut member of the device preferably is adapted to be initially sheared, fractured, or otherwise removed from the bolt member by activating a cartridge containing an explosive or deflagrating charge to release the tensile restraining forces of the device. This preferably is accomplished by causing one of the two piston means to ram the nut member with sufficient force to shear the same. The bolt member preferably is adapted to then be extracted from between the joined structural elements being separated by the forces of explosion or deflagration to remove any shear restraining means from between the elements being separated. This preferably is accomplished by having the first piston means uncover a port means to permit hot, expanding gases to either directly activate the second piston means or set off a second cartridge containing an explosive or deflagrating charge to activate the second piston means. To accomplish the release function set forth above, the two piston means preferably are coaxially arranged and preferably are adapted to extend from a cylinder housing fixed to one of the two separable structures into an aperture in the other separable structure.

A more detailed description of a specific embodiment of the device of this invention is given below with reference to the accompanying drawing, which is a sectional elevational view showing the device as applied to join a solid motor attachment beam 10 to a core longeron 11 of a rocket shown in phantom.

A cylinder case 12 is fastened to the solid motor attachment beam 10 by cylinder case attachment bolts 13 and 14. Cylinder case 12 is provided with an O-ring 16 and a charged cartridge 17 functioning as an auxiliary charge.

A pin 18 is provided with a piston 19 slidably mounted in a cylinder 21. Piston 19 is provided with an O-ring 22 and an actuator rod 23 connected thereto. A shear pin 24 holds actuator rod 23 in the position shown in the drawing, with piston 19 below ports, or ignition orifices 26 and 27, constituting orifices or openings between cylinder 21 and auxiliary charge 17.

A pin piston 28, coaxially arranged with actuator rod piston 19 and provided with O-rings 29 and 30, is threadedly engaged on the lower end of pin 18, as shown in the drawing. Cartridge chambers 32 and 33 are formed in pin piston 28 and are made to communicate with each other through bifurcated passage 34, which in turn communicates with cylinder 21.

Charged cartridges 36 and 37 are loaded in chambers 32 and 33, respectively. Electrical connectors 38 and 39, provided with electrical leads 41 and 42, respectively, are operationally attached to chambers 32 and 33, respectively, to activate charged cartridges 36 and 37, respectively, when desired. A retainer flange 43, provided with an aperture 44 for passage of leads 41 and 42 therethrough, is threadedly attached to cylinder case 12 to retain pin piston 28 after the release operation is completed. By "charged cartridge" as used in the specification and claims is meant explosive means broadly which can be detonated or exploded by actuation by conventional means. Conventional explosives used for this type application can be used.

The upper end of pin 18 is provided with an integral reduced diameter portion 46, which is threaded and passed through a washer 47. A split threaded sleeve 48 is threadedly engaged on upper portion 46 of pin 18 and bears against washer 47 for tensile engagement of longeron 11 with beam 10. A separation nut case element 49, provided with a nut piston 51 is fastened on split sleeve 48 by a flanged collar 50, threadedly engaged to element 49 and gripping under a shoulder on split sleeve 48. Keys 52 and 53, disposed in keyways 54 and 55 in the segments of split sleeve 48, are fitted in slots of element 49 to transmit torque from element 49 to the segments of split sleeve 48. Nut piston 51 is provided with an extension 56 which extends down through reduced diameter portion 46 of pin 18, to contact the end of actuator rod 23.

When it is desired to set the separation mechanism of the device of this specific embodiment of the invention into operation, the action is initiated by sending an electrical signal to one of the loaded pressure cartridges 36 and 37 through the corresponding pair of leads 41 and 42, respectively, via one of the corresponding electrical connectors 38 and 39, respectively. Functional redundancy is provided by the use of two loaded pressure cartridges 36 and 37, either one of which is capable of performing the entire function. Furthermore, the output of hot gases of either cartridge 36 or 37 ignites the other cartridge so that double the propellant charge required is released as an additional factor of reliability.

The resulting released propellant charge pressurizes the volume below piston 19 in cartridge chambers 32 and 33 and passage 34. The resulting pressure increase, acting upon piston 19 and actuator rod 23, shears shear pin 24, causing the actuator rod to drive upwardly. Actuator rod 23 actuates case element 49 through nut piston 51 and member 56 causing case means 49 to move upwardly shearing collar 50. Collar 50 retains keys 52 and 53 in the slots of element 49 causing them to ride upwardly in the keyways 54 and 55 with the element 49. When the keys 52 and 53 reach the sloping ramps at the end of the keyways 54 and 55, the keys 52 and 53 bear on the bottoms of the ramps causing the upper ends of the segments of the split sleeve 48 to move inwardly. The latter causes the lower ends of the segments to move outwardly, hence flipping the segments from engagement with the threaded portion 46 of pin 18. This results in a release of the tensile restraint of the fastening and separation structure.

The actuator rod piston 19, during the course of its upward movement, uncovers ignition orifices 26 and 27, allowing hot gases from cartridges 36 and 37 to ignite charged cartridge 17. The gases from ignited cartridge 17 pressurize the volume above pin piston 28 and inside cylinder case 12. This pressure forces pin piston 28 and pin 18 downwardly. Threaded portion 46 of pin 18 moves downwardly through washer 47, pin 18 moves through core longeron 11 and solid motor attachment beam 10 to release the shear restraint. At the end of its stroke, pin piston 28 is stopped and retained by retainer flange 43. A substantially completely uninterrupted interface remains on the core longeron 11 after completion of the separation operation.

Although cartridge 17 is described, in the specific embodiment given hereinabove, as being ignited by the hot gases of ignited cartridges 36 and 37, it will be understood that separate ignition means can be provided to ignite cartridge 17. Also, it will be understood that the use of only cartridges such as 36 and 37, without the use of any auxiliary cartridges such as cartridge 17, to accomplish the release both of the tensile restraint and of the shear restraint, is contemplated as being within the scope of the invention.

Obviously, many other modifications, and variations of the fastening and separation device of the present invention are possible in the light of the teachings given hereinabove. It is, therefore, to be understood that, within the scope of the appended claims, the invention can be practiced otherwise than as specifically desired.

What is claimed is:

1. A releasable fastening mechanism for releasably securing a first part to a second part comprising: a connecting bolt means for extending through said parts having a first end and a second end; actuator rod means positioned centrally of said bolt means to move longitudinally relative thereto; first securing means for contacting the outer face of said first part releasably attached to said first end of said bolt means; locking means for releasably locking said first securing means to said first end of said bolt means adapted to contact one end of said actuator rod means; second securing means for contacting the outer face of said second part including a hollow case; and actuating means supported in said case externally of said first and second parts for sequentially moving said actuator rod means in a first direction to effect release of said locking means and moving said bolt means in a second direction opposite said first direction to clear it of said parts fastened together by the fastening means, said actuating means including first and second communicating piston chambers having therein first and second piston means, respectively, and first and second propelling means for sequentially propelling said first and second piston means in said first and second directions, respectively, said piston chambers and said first piston means constructed and arranged so that said piston chambers are placed in communication by movement of said first piston in said first direction.

2. The fastening mechanism of claim 1 in which said locking means is shearably attached to said first end of said bolt means and release of said locking means is effected by shearing it from said first end of said bolt means.

3. A releasable fastening mechanism for releasably securing a first part to a second part comprising: a connecting bolt means for extending through said parts having a first end and second end; actuation rod means positioned centrally of said bolt means to move longitudinally relative thereto; first securing means for contacting the outer face of said first part releasably attached to said first end of said bolt means; locking means for releasably locking said first securing means to said first end of said bolt means adapted to contact one end of said actuator rod means; second securing means for contacting the outer face of said second part including a first piston chamber; a first piston means in said first piston chamber attached to said second end of said bolt means; first driving means for driving said first piston means in a first direction away from parts secured together by said fastening mechanism; a second piston chamber between said second end of said bolt means and said first piston means; a second piston in said second piston chamber contacting the other end of said actuator rod; second driving means for driving said second piston in a direction opposite said first direction to release said locking means; and actuating means for sequentially actuating first said second driving means to release said locking means and second said first driving means to clear said bolt means from parts secured together by the securing means.

4. A releasable fastening mechanism for releasably securing a first part to a second part comprising: a connecting bolt means for extending through said parts having a first end and a second end; actuation rod means positioned centrally of said bolt means to move longitudinally relative thereto; first securing means for contacting the outer face of said first part releasably attached to said first end of said bolt means; locking means for releasably locking said first securing means to said first end of said bolt means adapted to contact one end of said actuator rod means; second securing means for contacting the outer face of said second part including a first piston chamber; a first piston means in said first piston chamber attached to said second end of said bolt means; first explosive means positioned between said first piston means and said parts secured together by said fastening mechanism; a second piston chamber in said second end of said bolt means; a second piston member in said second piston chamber attached to the other end of said rod actuator means; second explosive means connected by at least one communicating passage with said second piston chamber; and actuating means for sequentially actuating first said second explosive means to release said locking means and second said first explosive means to clear said bolt means from parts secured together by the fastening means.

5. The fastening means of claim 4 in which said actuating means includes communicating means for establishing communication between hot gases from said second explosive means to said first explosive means.

6. The fastening means of claim 5 in which said communicating means includes at least one channel between said first explosive means and a section of said second piston chamber below said second piston means in its advanced position.

References Cited by the Examiner

UNITED STATES PATENTS

| | | | |
|---|---|---|---|
| 2,421,807 | 6/47 | Richey et al. | 89—1.5 |
| 2,883,910 | 4/59 | Nessler | 89—1.5 |
| 3,032,356 | 5/62 | Botsford | 102—49 X |
| 3,053,131 | 9/62 | Stott | 89—1 |
| 3,147,663 | 9/64 | Brown | 89—1 |

BENJAMIN A. BORCHELT, *Primary Examiner.*

SAMUEL W. ENGLE, *Examiner.*